United States Patent
Robertsson

(10) Patent No.: US 6,259,832 B1
(45) Date of Patent: Jul. 10, 2001

(54) TESTING OF OPTICAL TRANSMITTER AND RECEIVER MODULES

(75) Inventor: Mats Robertsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/263,099

(22) Filed: Mar. 5, 1999

(30) Foreign Application Priority Data

Mar. 6, 1998 (SE) ...................................... 9800755

(51) Int. Cl.⁷ ...................................... G02B 6/13
(52) U.S. Cl. .............................. 385/14; 385/129; 385/130
(58) Field of Search ................................ 385/12, 14, 129, 385/130

(56) References Cited

U.S. PATENT DOCUMENTS

| | | | |
|---|---|---|---|
| 4,926,545 | * 5/1990 | Pimpinella et al. | 29/832 |
| 5,313,536 | * 5/1994 | Rossi et al. | 385/14 |
| 5,400,419 | * 3/1995 | Heinen | 385/14 |
| 5,546,325 | 8/1996 | Aulet et al. . | |
| 5,631,571 | 5/1997 | Spaziani et al. . | |
| 5,631,759 | 5/1997 | Bogdan et al. . | |
| 5,663,739 | * 9/1997 | Pommerenke et al. | 345/1 |
| 5,825,951 | * 10/1998 | Kitamura | 385/45 |

OTHER PUBLICATIONS

Tsai et al., "A Novel Scheme for Efficient Excitation of High–Density Channel–Waveguide Array Using Ion–Milled Planar Microlens Array", Optoelectronics, Devices and Technologies, vol. 5, No. 2, Dec. 1990, pp. 317–324.

Robertsson et al., "New Patternable Dielectric and Optical Materials For MCM–L/D–and o/e–MCM–packaging", First IEEE Int. Symp. On Polymeric Electronics packaging, Oct. 26–30, 1997, Norrköping, Sweden.

Copy of Swedish Patent Application No. SE 9800757–8, "Optoelectric Multichip Module".

* cited by examiner

Primary Examiner—John D. Lee
Assistant Examiner—Jennifer Doan
(74) Attorney, Agent, or Firm—Burns, Doane, Swecker & Mathis, L.L.P.

(57) ABSTRACT

When fabricating electro-optic modules at least one optical transmission module and at least one optical reception module are fabricated on the same substrate. Optical waveguides are arranged on the substrate between a light-emitting component in one module and a light-detecting component in a neighbouring module. The light-emitting component and the light-detecting component are energized and the transmission of light between the components is tested. Then the substrate is split into individual modules along division lines. The optical connection between the modules is then broken and the waveguides can be connected to optical fibers by means of a connector. Electronic driver circuits can be mounted on the modules. The modules can also have integrated electric connections between the driver circuits and the optocomponents. The optical testing is in this way executed in a simple and automatic way involving a minimum of manual operations since substantially all transmitter and receiver modules can be tested at the same time in the same testing equipment.

6 Claims, 4 Drawing Sheets

TESTING OF OPTICAL TRANSMITTER AND RECEIVER MODULES

The present invention relates to testing optical transmitter and receiver modules.

BACKGROUND

Telecommunication systems using light propagating in different waveguides expand more and more today. There is a large interest in extending the optical networks even up to private homes or local business estates, the so called local access network which is also called "Fibre To (In/From) the Home", "Fibre To (In/From) the Customer (Business)", etc. Also, there is a large interest in extending the use of optical networks in LANs, i.e. local area networks, used for interconnecting computers in a business estate and furthermore for communication inside computer equipment and for communication between computers and peripheral devices such as printers etc. In order to achieve this expansion, the costs of the components of the optical networks of course have to be reduced as much as possible. Very important costs are related to producing the optical transmitter and receiver modules including lasers, LEDs, etc. and other active or passive devices. A part of these costs are in turn associated with testing finished optoelectrical modules which are to be mounted e.g. on printed circuit boards.

In conventional testing of optical modules manufactured at the surface of a substrate the respective optical device of a module is energized and the light is emitted in the case of an optical transmitter device and the electrical signals output from an optical receiver device are studied when injecting light into the receiver device. Such a method is disclosed in e.g. U.S. Pat. No. 5,631,571. General testing methods of electro-optic modules are disclosed in U.S. Pat. Nos. 5,631,759 and 5,546,325 and microlenses for injecting light for such testing is described in Tsai, Yang and Le, "A novel scheme for efficient excitation of high-density channel-waveguide array using ion-milled planar microlens array", Optoelectronics, Devices and Technologies, Vol. 5, No. 2, December 1990, pp. 317–324.

SUMMARY

It is an object of the invention to provide a method of testing optical modules in a simple way that is suited to be integrated in a process for mass-fabrication of such modules.

The problem solved by the invention is that how to arrange optical modules when they are fabricated so that the testing thereof can be facilitated, in particular so that it can be automatically executed requiring a minimum amount of extra connection devices for supplying electrical power and for injecting light of an adapted intensity.

Thus, generally at least one optical transmission module and at least one optical reception module are fabricated on the same substrate. An optical connection, i.e. some optical waveguide, is arranged on the substrate between a light-emitting component in one module and a light-detecting component in another module. The light-emitting component and the light-detecting component are energized and the transmission is tested. Then the substrate is split into individual modules, the optical connection then being broken and the waveguide terminating at the edge of such module. There the waveguide can be connected to another optical waveguide such as an optical fiber by means of some connector.

The optocomponents on each module may be supplemented with electronic driver circuits mounted on the same module and on the module there may also be electric connections between the driver circuits and the optocomponents. The optical testing can then be made very rational involving a minimum of manual operations since substantially all transmitter and receiver modules can be tested at the same time in the same testing equipment. A substrate can comprise only a single pair of optical transmitter and receiver modules up to thousands of such pairs depending on the sizes of the transmitter and receiver devices and of the substrate.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

The multichip module to be described is made of materials as described in M. Robertsson, A. Dabek, G. Gustafsson, O.-J. Hagel, M. Popall, "New Patternable Dielectric and Optical Materials for MCM-L/D- and o/e-MCM-packaging", First IEEE Int. Symp. on Polymeric Electronics packaging, Oct. 26–30, 1997, Norrköping, Sweden. In that article photo-patternable polymer materials, ORMOCER, are disclosed which are suitable for optoelectrical multichip modules in order to build optical waveguides. In particular the refractive indices of these materials can be varied for producing cores and claddings of optical waveguide structures.

Figure 1:
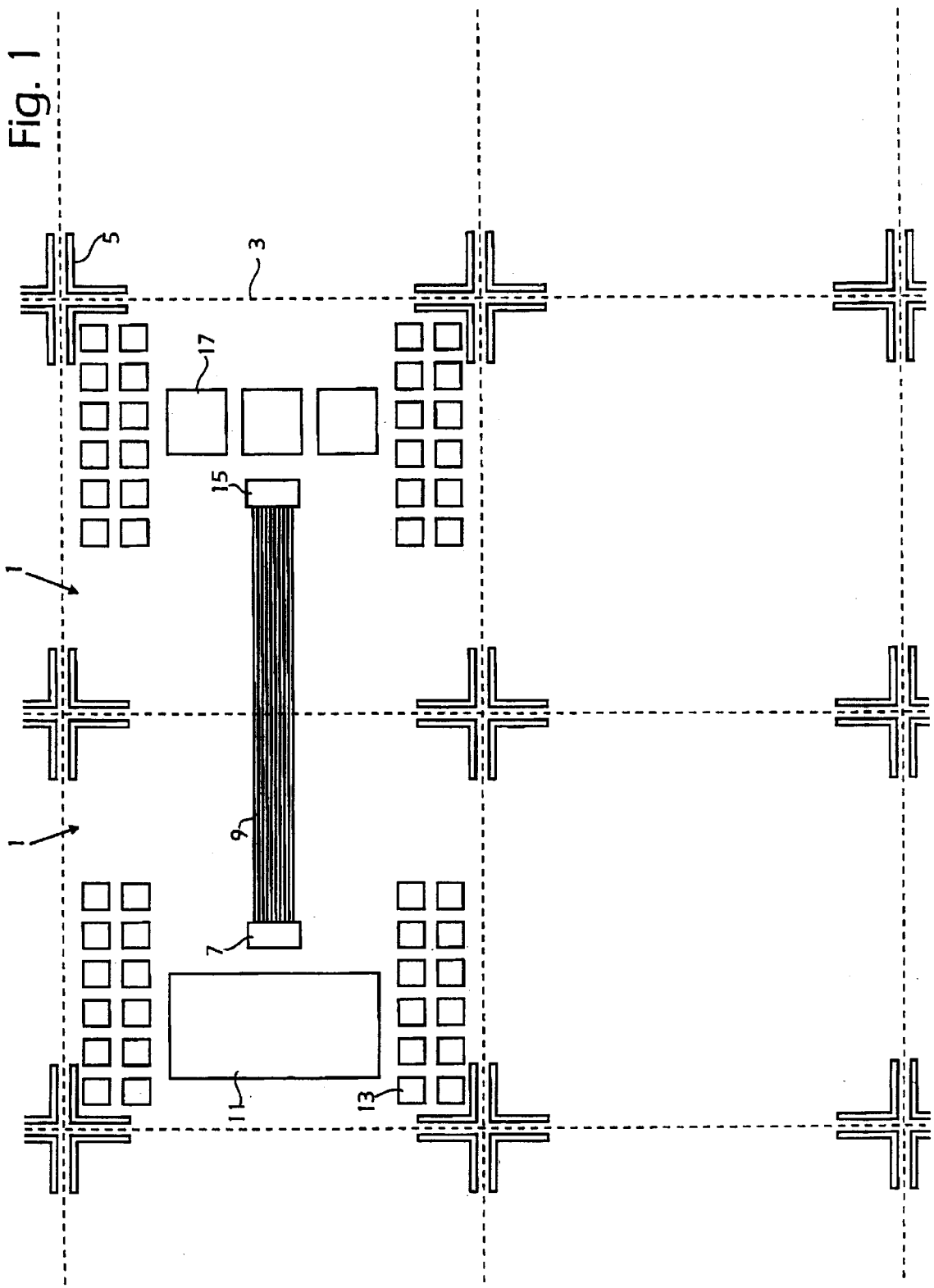
FIG. 1 is a plan view of a portion of a substrate covered by a multilayer structure forming electrical signal paths and optical waveguides, the portion in particular illustrating a transmitter module and a receiver module.

In FIG. 1 a plan view of a portion of a substrate coated with various layers is shown, having optical and electric components mounted thereon and fabricated as disclosed in the simultaneously filed Swedish patent application "Optoelectric multichip module". After manufacturing the substrate and having components mounted thereon it is intended to be divided in square modules 1, the division lines being indicated at 3 and marks for cutting the substrate being shown at 5. At 7 a surface-emitting laser chip is shown, comprising five individual laser units. They emit light into optical waveguides 9 extending perpendicularly to a division line 3 into a neighbouring module 1. On the module of the laser chip 7 an electronic driver circuit chip 11 is located and furthermore electric contact pads 13 are placed in the marginal region of the considered module 1. On the neighbouring module, into which the optical waveguides 9 extend, a photodetector chip 15 is located receiving light from the optical waveguides 9. Three electronic driver chips 17 are also located on this module and furthermore electrical contact pads are provided.

In order to test the substrate of FIG. 1, the driver circuits 11, 17 and the optical chips 7, 15 are energized by e.g. supplying electrical current to a current supply plane, not shown, inside the substrate. Suitable signals can be provided either to the contacts on the substrate or directly to the respective module, using suitable ones of the contact pads 13. In the testing procedure so called "eye-opening" diagrams can be studied and evaluated.

Figure 2:
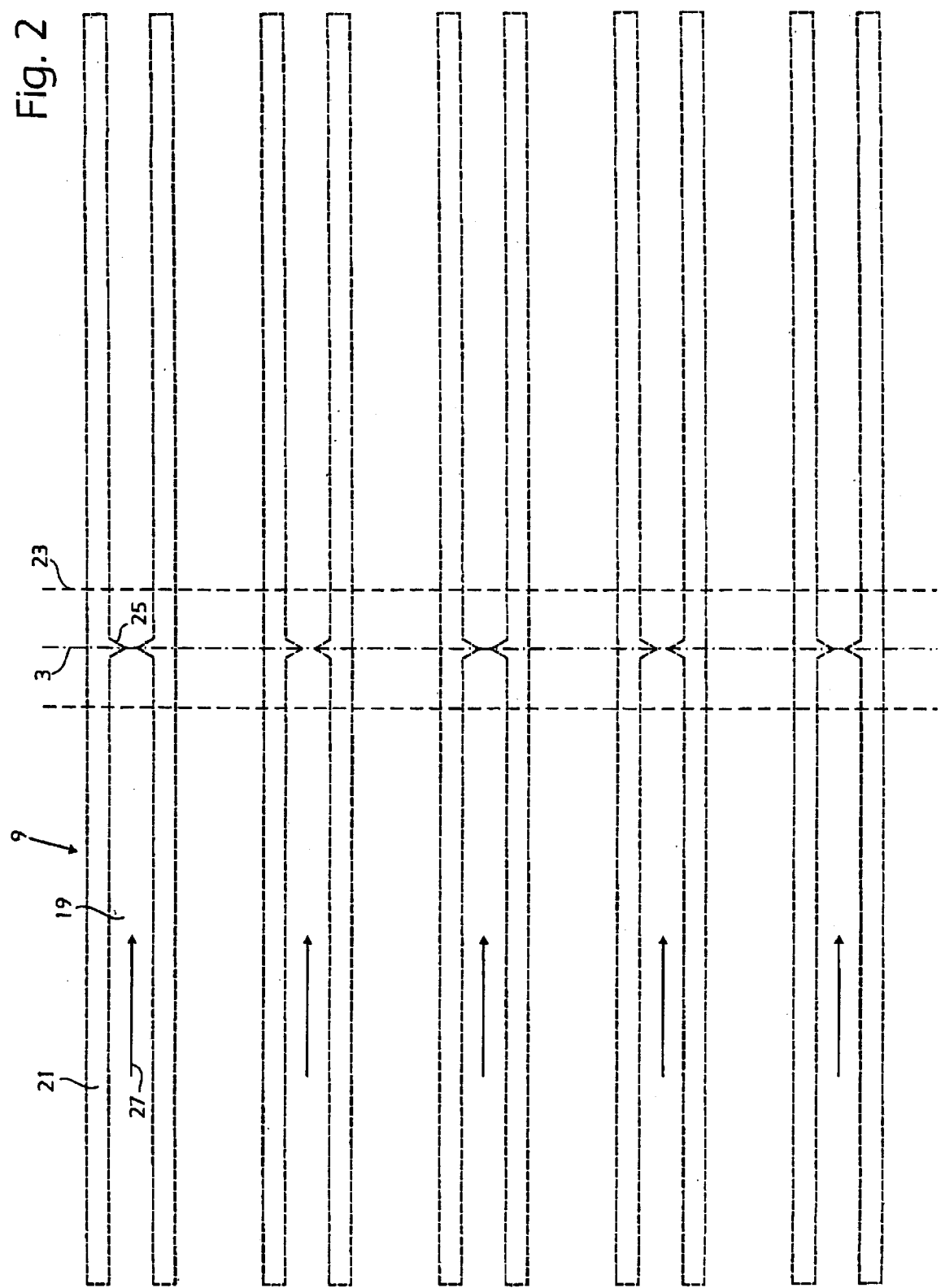
FIG. 2 is a plan view of a small region of the substrate portion showing optical waveguides having attenuation means at a division border.

The optical interconnection of the laser units and the light detector chip through the waveguides 9 can be provided with an intentional optical attenuation, e.g. in the region of the waveguides in which they pass the sectioning lines 3 and which is removed when cutting the substrate into the individual modules. This illustrated in FIG. 2, in which a region of the waveguides 9 at the sectioning line 3 is shown. The waveguides 9 are constituted of cores 19 surrounded by cladding strips 21. When dividing the substrate into modules 1, some material of the substrate will be removed by for instance sawing, such as between the lines shown at 23. "Angular scores" 25 in the waveguide cores 19 and at the module border 3 are produced by letting the cladding strips 21 have corresponding triangular projections at the border 3. These scores 25 are photolithographically defined when making the recesses in a waveguide core layer which will receive material from a top cladding layer also penetrating into these recesses forming the cladding strips 29 at the side of the waveguide cores 19, see the above cited simultaneously filed patent application. These angular scores 25 will act attenuating on light propagating in the waveguides 9 as indicated by the arrows 27. Since the angular scores are located between the lines 23, they will be removed when splitting the substrate into modules and will thus not affect the finished modules.

Figure 3:
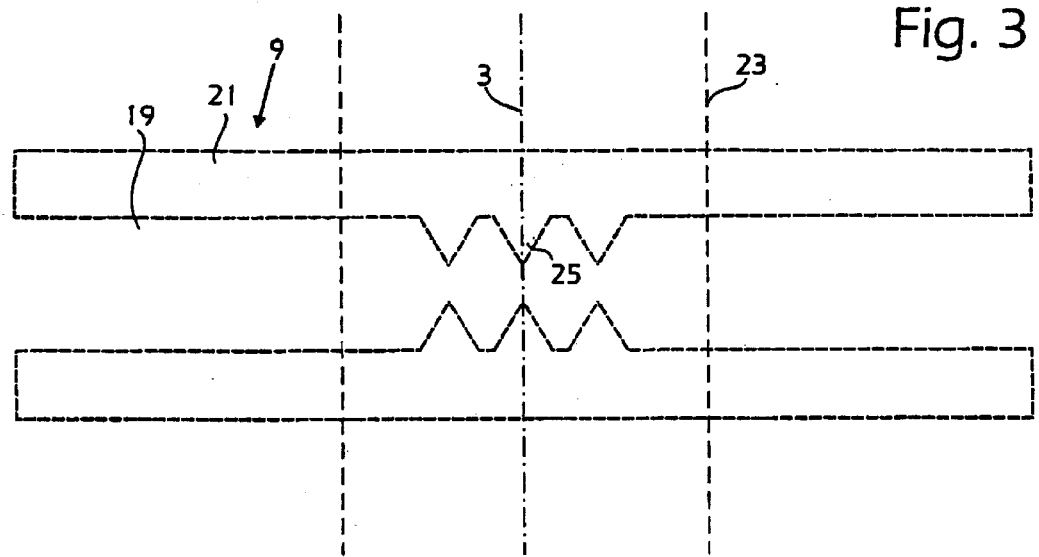
FIGS. 3–6 are plan views of a substrate region showing an optical waveguide having alternative attenuation means.
Figure 4:
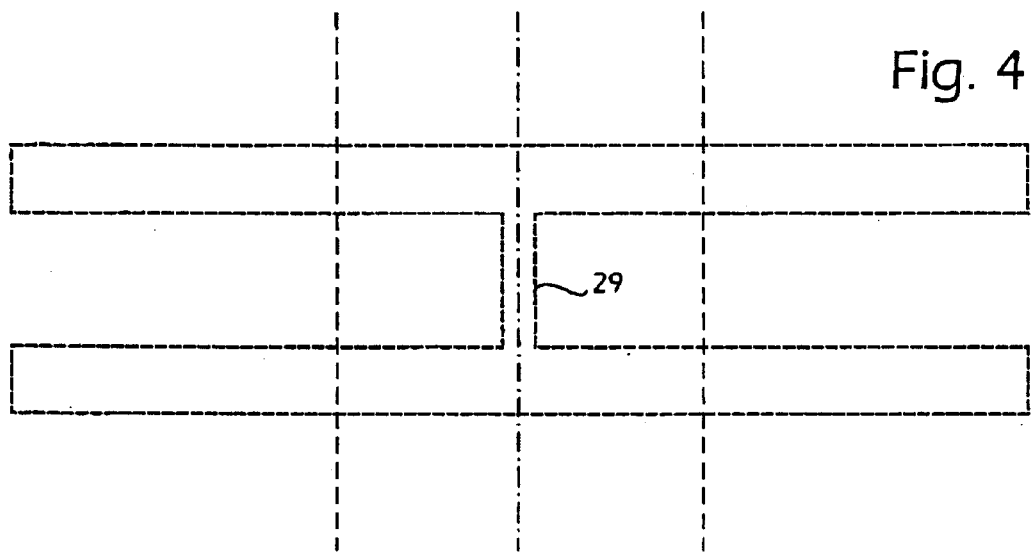
Figure 5:
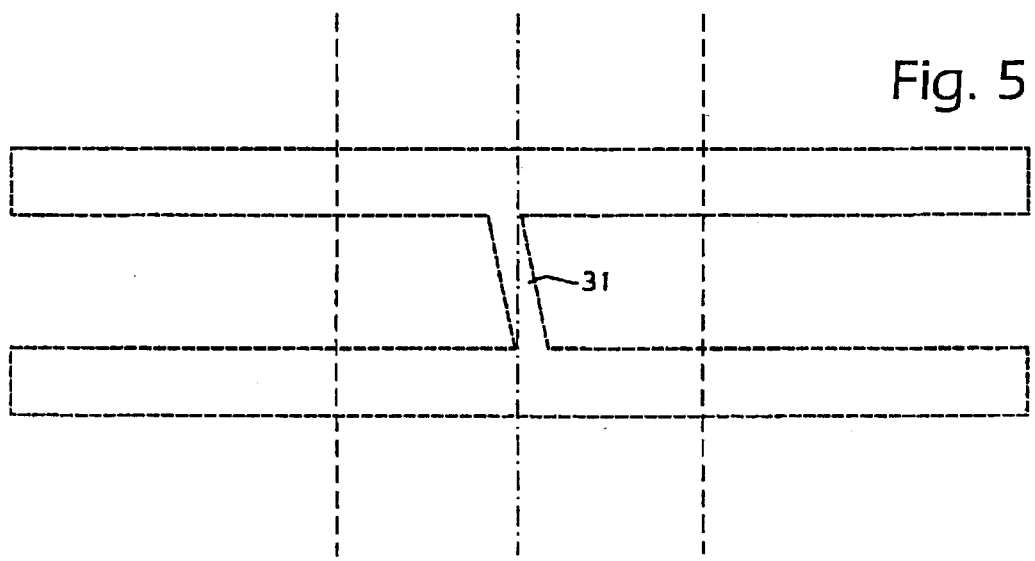

The additional attenuation produced by such attenuating devices can then suitably correspond to a "typical attenuation" or a "maximum acceptable attenuation" as specified for the optical connection of the optical transmitter and receiver, what can be obtained by a proper selection of the magnitude of geometrical dimensions of the incisions 25. If required, several incisions 25 can be arranged at the module border 3 between the lines 23, as is shown in FIG. 3. Alternative attenuator geometrical designs are illustrated in FIGS. 4 and 5. Here the cladding material in the strips 21 are made to form a straight cut-off 29 of the waveguide cores 19 and an oblique cut-off 31 respectively. The cut-offs 29 and 31 are thus regions or strips having a uniform width which extend from one cladding strip 21 to the neighbouring cladding strip through the waveguide cores 19.

Figure 6:
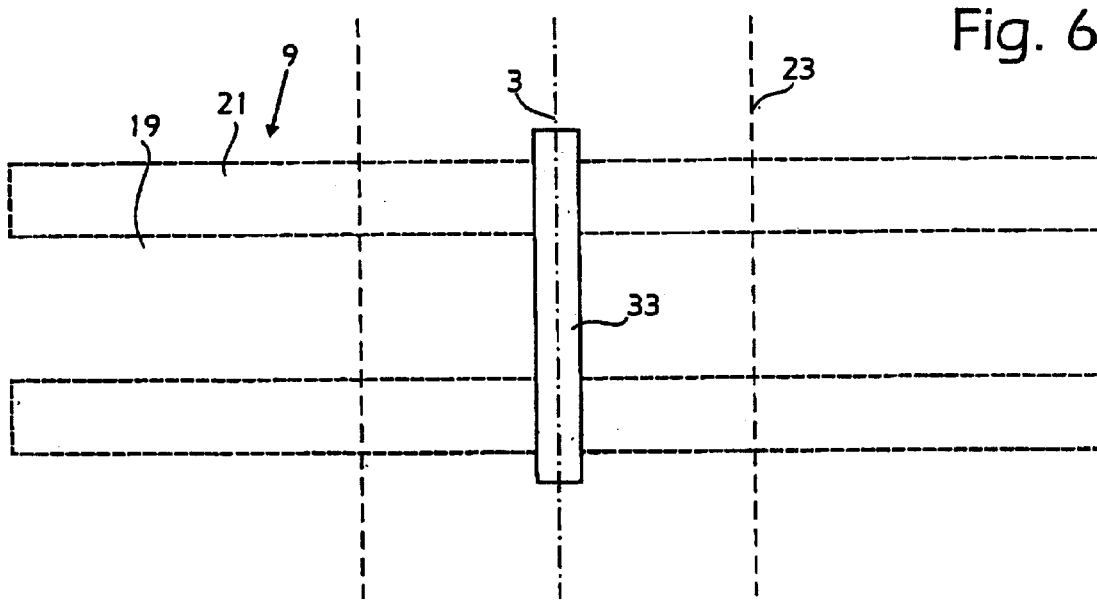

In FIG. 6 instead recesses 33 are made from the top surface of the substrate, at the module border 3 as above and cutting off the waveguide cores 19. These recesses can if desired or required be filled with some suitable material, such a liquid having an adapted refractive index, during the testing procedure. Then even liquids having different refractive indices can be used. Such a recess 33 can also be formed interactively during the testing process by having a laser beam ablating material from the surface of the substrate. Then the recess will have a gradually increasing depth and a corresponding increasing attenuation will be obtained at the module border.

Generally thus, the additional attenuation which can be required for an accurate testing of components can be obtained by exterior influence such as by deforming, shaping or removing portions of the waveguides for example mechanically. Using an integrated thermoelectric Mach-Zehnder modulator, not shown, in the waveguides 9, which can be produced requiring no extra costs, the attenuation can be electrically controlled by the testing equipment. Also, a thermo-optical evanescent-field coupler can in principle provide the same function. However, such solutions require some space of the module surface and are thus not always feasible. By controlling the attenuation in that way an estimation of Bit Error Rate BER or "eye-opening" to the link losses or dynamic range (often length of the link) can be obtained in a relatively simple way and automatic.

Of course, there may be more than one light emitting chip on a single module and more than one light detecting chip on the other module. A plurality of optical waveguides may then be provided, in the general case including optical splitter or combiners, so that the devices of all modules can be tested.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spit or scope of the general inventive concept as defined by the appended claims and their equivalents. It is therefore to be understood that the appended claims are intended to cover all such modifications and changes as fall within a true spirit and scope of the invention.

I claim:

1. A method of producing optical transmitter and receiver modules, comprising the steps of:
   providing a substrate,
   applying at least one optical waveguide to or in a surface of the substrate to pass from a first module region of the substrate to a neighbouring second module region of the substrate across a division line,
   mounting an optical transmitter device in the first module region and an optical receiver device in the second module region at ends of the at least one optical waveguide, so that light generated by the optical transmitter device when energized is transmitted in the at least one optical waveguide to propagate in the at least one optical waveguide up to the optical receiver device receiving the light when energized,
   supplying power to the optical transmitter device and to the optical receiver device,
   detecting signals issued by the receiver device in response to received light, and
   cutting the substrate along the division line to form tested optical transmitter and receiver modules.

2. The method of claim 1, wherein, in the step of applying the at least one optical waveguide, the at least one optical waveguide is provided with a light attenuator located in a region of the at least one optical waveguides at the division line.

3. The method of claim 1, wherein, in the step of applying the at least one optical waveguide, incisions or scores is produced in an optical waveguide core of one of the at least one optical waveguide at a region of said one of the at least one optical waveguide at the division line to attenuate light propagating in said one of the at least one optical waveguide in the step of supplying power to the optical transmitter device and to the optical receiver device.

4. The method of claim 1, wherein, in the step of applying the at least one optical waveguide, a portion of an optical waveguide core of one of the at least one optical waveguide is given a reduced cross-section area compared to adjacent portions of the optical waveguide core, the portion being located at the division line to attenuate light propagating in said one of the at least one optical waveguide in the step of supplying power to the optical transmitter device and to the optical receiver device.

5. The method of claim 1, wherein, in the step of applying the at least one optical waveguide, an interruption of an optical waveguide core of one of the at least one optical waveguide is made at the division line to attenuate light propagating in said one of the at least one optical waveguide in the step of supplying power to the optical transmitter device and to the optical receiver device.

6. The method of claim 5, wherein the interruption of an optical waveguide core is produced by making a strip-shaped recess or groove extending through the waveguide core.

* * * * *